July 11, 1961 B. V. BOWDEN 2,991,659
GYROSCOPES
Filed March 16, 1959 4 Sheets-Sheet 1
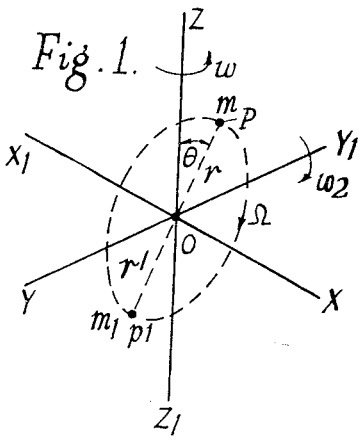
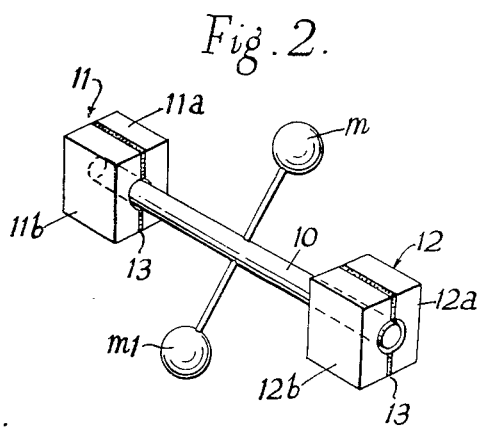
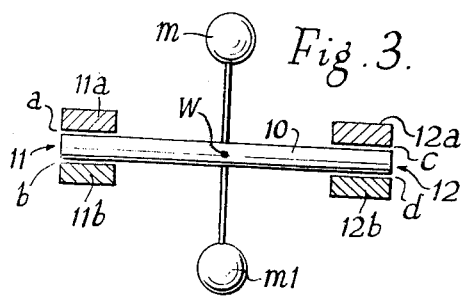
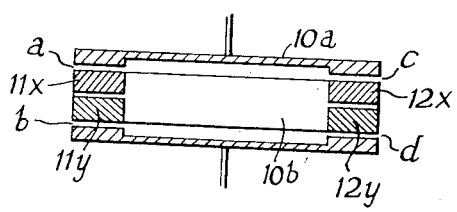
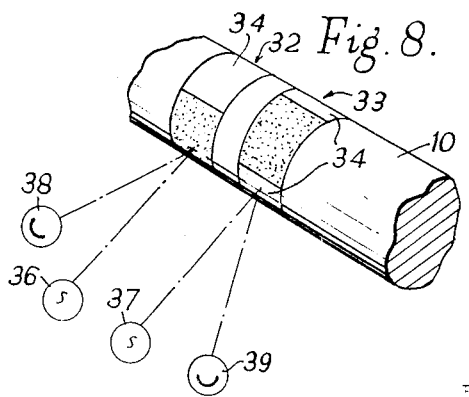
INVENTOR
BERTRAM VIVIAM BOWDEN
BY Larson and Taylor
ATTORNEY

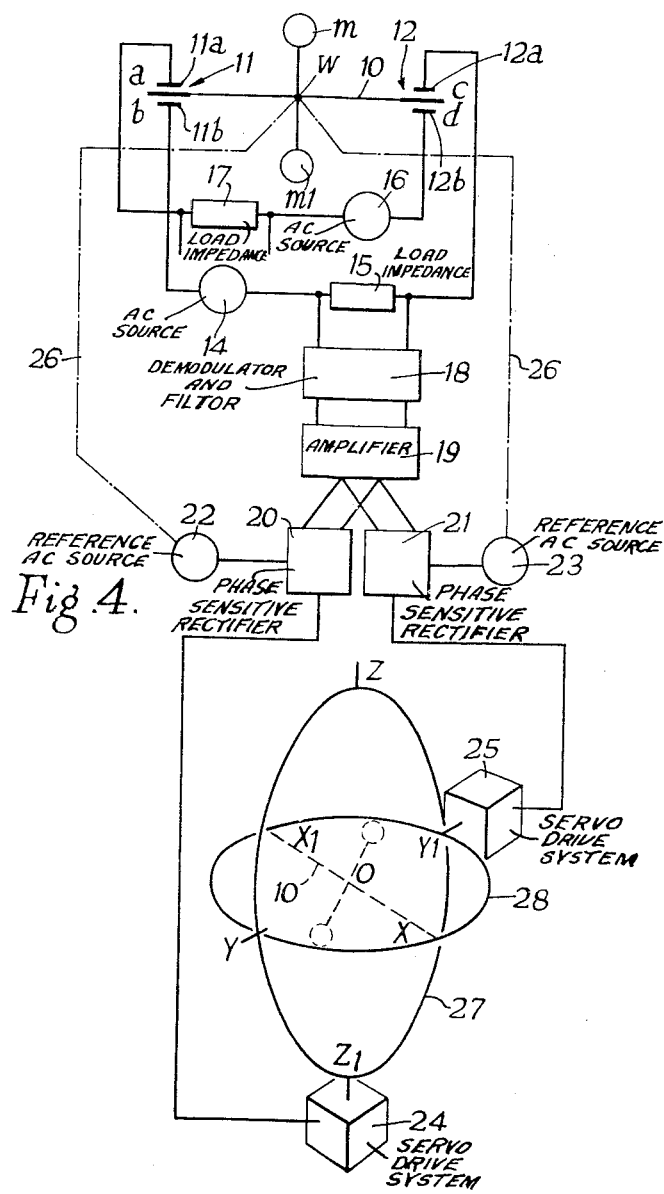

July 11, 1961  B. V. BOWDEN  2,991,659
GYROSCOPES
Filed March 16, 1959  4 Sheets-Sheet 3

INVENTOR
BERTRAM VIVIAN BOWDEN
BY Larson and Taylor
ATTORNEY

July 11, 1961 B. V. BOWDEN 2,991,659
GYROSCOPES
Filed March 16, 1959 4 Sheets-Sheet 4
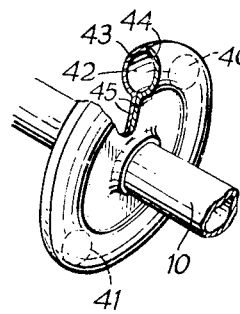
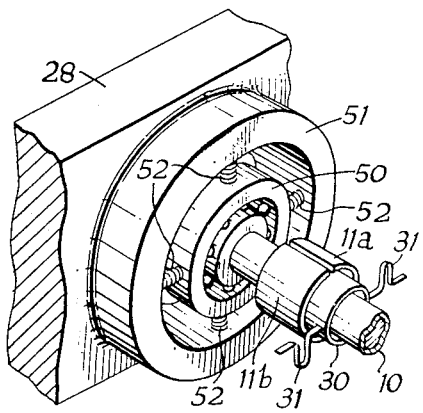
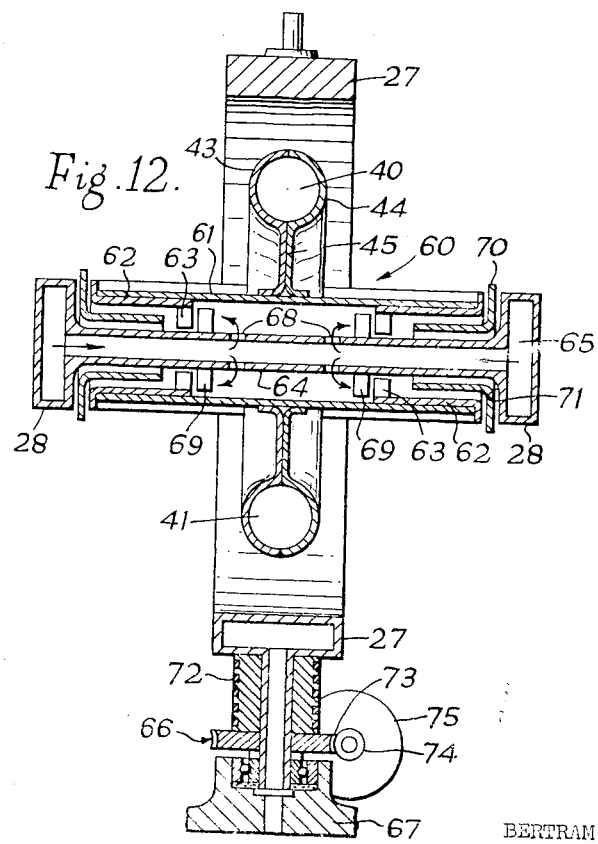
INVENTOR
BERTRAM VIVIAN BOWDEN
ATTORNEY

United States Patent Office 2,991,659
Patented July 11, 1961

2,991,659
GYROSCOPES
Bertram Vivian Bowden, Hale, England, assignor to National Research Development Corporation, London, England, a British corporation
Filed Mar. 16, 1959, Ser. No. 799,560
Claims priority, application Great Britain Mar. 18, 1958
19 Claims. (Cl. 74—5.6)

This invention relates to gyroscopes and has as one of its objects the provision of means for distinguishing without ambiguity between those precessional forces or movements which are due to motion of the gyroscope in space and those which are caused by imperfections in the construction of the gyroscope itself. A particular application of the invention is to the provision of a low-wander gyroscope.

A conventional free mounted gyroscope, consisting of a flywheel which is caused to rotate at high speed upon its axle within a gimbal system providing freedom for rotation about each of two mutually perpendicular axes each perpendicular to the axis of rotation of the flywheel, will be caused to precess solely by reason of movement of the gyroscope in space only if the wheel is perfectly balanced and if the respective gimbal axes each pass exactly through the centre of gravity of such wheel and gimbal system. As a significant rate of precession may be caused by displacement of the flywheel axle along its bearings by no more than one or two microns, the inevitable errors in manufacture of conventional designs are sufficient to make the gyroscope wander to an extent which imposes fundamental limits on its use as a navigational instrument, particularly in view of the large and sudden accelerations to which the gyroscope is subjected when it is mounted in an aircraft or missile. Similar considerations apply to those gyroscopes which are constrained to move by applied forces, such as those imposed by the rest of a navigational instrument of which the gyroscope forms part.

In the gyroscope of the present invention, the conventional flywheel of the rotor is replaced by a member which provides, effectively, two individual masses mounted at opposite ends of a diameter perpendicular to the rotor axle which is itself carried in bearings which permit a limited amount of displacement movement thereof relative to the gimbal member in which it is journalled in directions perpendicular to the rotor axis, the gyroscope being also provided with means for sensing such displacement movements and for deriving therefrom alternating current signals, and means for determining the frequency and phase relationships of such derived signals to a reference alternating current having a frequency and phase directly related to the rotation of said rotor. From such determination of frequency and phase relationship, it is possible to derive one or more output signals suitable for use as a precession-indicating or an error-correcting medium. As bearings for the rotor axle use is preferably made of gas or air bearings, for instance, as described by Ford, Harris and Pantall in Proc. I. Mech. E. 171, 2, 1957.

In order that the nature of the invention may be more readily understood, a number of embodiments thereof will now be described in greater detail with reference to the accompanying drawings, in which:

FIGURE 1 is a diagram illustrating the principles underlying the invention;

FIGURE 2 is a largely schematic perspective view of an elementary form of rotor and its associated displacement-sensing bearings;

FIGURE 3 is a longitudinal cross-sectional view through the rotor arrangement of FIGURE 2;

FIGURE 4 is a schematic diagram of one self-correcting gyroscope in accordance with the invention;

FIGURE 5 is a longitudinal cross-section, similar to FIGURE 3, of an alternative rotor arrangement;

FIGURE 8 is a largely schematic view of one arrangement for providing the requisite reference alternating currents;

FIGURE 10 is a perspective view, partly in section, of one practical form of rotor construction;

FIGURE 11 is a perspective view of an alternative form of rotor bearing construction;

FIGURE 12 is a cross-sectional view, taken in the longitudinal direction of the rotor axle, of one somewhat simplified constructional form of gyroscope embodying the invention.

Figure 6:
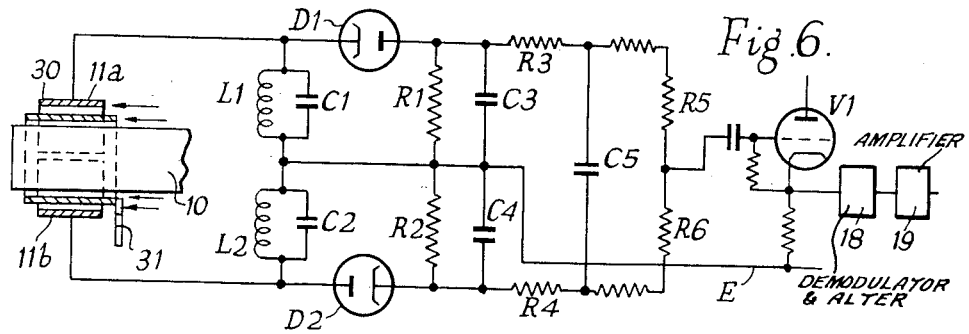
FIGURE 6 is a more detailed circuit diagram of one form of signal demodulator shown in association with a modified form of sensing device at one end of the gyroscope rotor axle.

Referring first to FIGURE 1 which indicates a system of three mutually perpendicular axes $XOX_1$, $YOY_1$ and $ZOZ_1$ which intersect at the point O. Axis $XOX_1$ is that of the gyroscope rotor while the axes $YOY_1$ and $ZOZ_1$ are those of the two gimbal members of the associated gimbal system. The rotor comprises masses $m$ and $m_1$ located at opposite ends of a diameter passing through the point O.

Consider now the mass $m$ as being very small and constrained to rotate about the axis $XOX_1$ in the plane YOZ with an angular velocity $\Omega$. Assume also that the axes $XOX_1$ and $YOY_1$ are made to rotate about the axis $ZOZ_1$ with an angular velocity $\omega$. If now, mass $m$ is at the point P where the angle POZ is $\theta$, then the distance of point P from the axis line OZ is given by $r \sin \theta$ where $OP = r$. The velocity of the mass $m$ in the direction of OX is therefore $(r \sin \theta)\omega$ and the acceleration of the mass $m$ in this same direction is $$\frac{d}{dt}\omega r \sin \theta = \omega r \cos \theta \frac{d\theta}{dt} = \omega \Omega r \cos \theta$$

This acceleration produces a force F which is given by $mr^2\omega\Omega \cos \theta$ and this force has a moment about the axis $ZOZ_1$ which is given by $Fr \sin \theta = mr^2\omega\Omega \cos \theta \sin \theta$. In similar manner this force F has a moment about the axis $YOY_1$ which is given by $Fr \cos \theta = mr^2\omega\Omega \cos^2 \theta$.

If now the rotating system is made symmetrical by the addition of the second mass $m_1$ at point $P_1$, where $P_1$ is on the line PO produced at a distance $r_1$ from the point O, then mass $m_1$ will produce a force having a moment about the axis $ZOZ_1$ which is given by $$m_1r_1^2\omega\Omega \cos(\theta+\pi)\sin(\theta+\pi) = m_1r_1^2\omega\Omega \cos \theta \sin \theta$$

The two masses $m$ and $m_1$ accordingly produce a couple about the axis $ZOZ_1$ having a moment of $$2mr^2\omega\Omega \cos \theta \sin \theta$$

if $r_1 = r$ and $m_1 = m$. Similarly they will produce a couple about the axis $YOY_1$ having a moment of $2mr^2\omega\Omega \cos^2 \theta$. The centrifugal forces produced by the rotation of the two masses will cancel out if, as is assumed, $r = r_1$ and $m = m_1$.

Since $\theta = \Omega t$, the couples which have to be sustained by the rotor axle of the gyroscope will be $$mr^2\omega\Omega \sin 2\Omega t \qquad (1)$$

$$mr^2\omega\Omega \cos 2\Omega t \qquad (2)$$

$$mr^2\omega\Omega \qquad (3)$$

where the couple (1) will be in the direction $YOY_1$ and the couples (2) and (3) will each be in the direction $ZOZ_1$.

Similarly, if for any reason the gyroscope is made to precess about the axis $YOY_1$ with an angular velocity $\omega_2$, then the couples which will have to be sustained by the rotor axle of the gyroscope will be $$mr^2\omega_2\Omega \sin 2\Omega t \qquad (4)$$
$$mr^2\omega_2\Omega \cos 2\Omega t \qquad (5)$$
$$mr^2\omega_2\Omega \qquad (6)$$

where couple (4) will be in the direction $ZOZ_1$ and the couples (5) and (6) will each be in the direction $YOY_1$.

However carefully the masses $m$ and $m_1$ are balanced there is almost certain to be a very small residual unbalance, the effect of which is to shift the centre of gravity of $m$ and $m_1$ slightly off the axis of rotation $XOX_1$ of the rotor. This will produce a small residual centrifugal force proportional to $$mk^2\Omega^2 \cos (\Omega t + \phi)$$

where $k$ is the unbalance and $\phi$ an unknown phase angle. There may also be an oscillation due to the axis of rotation $XOX_1$ not being parallel to a principal axis of inertia of the rotating system. The frequency of each of these unbalanced forces is $\Omega$, whereas the frequency of the couples given by (1), (2), (4) and (5) above is $2\Omega$.

Whereas in the conventional form of gyroscope the couples given by (3) and (6) above are exploited and those given by (1), (2), (4) and (5) are caused to vanish by the use of a completely uniform rotor wheel, the present invention makes use of the alternating forces governed by such Equations 1, 2, 4 and 5 and ignores the steady forces upon which the conventional gyroscope depends by deriving from such alternating forces electric signals which, by suitable amplification and filtering, are restricted to those having a frequency $2\Omega$. By suitable combination or comparison of these derived signals with a further reference signal or signals of the same frequency $2\Omega$ derived directly from the rotational movement of the rotor it is possible to distinguish between those forces which correspond to $\cos 2\Omega t$ and those which correspond to $\sin 2\Omega t$.

One arrangement for sensing or detecting the alternating forces set up by the above described couples and for deriving therefrom representative alternating electric signals will now be described with reference to FIGURES 2 and 3. In FIGURE 2, 10 indicates the rotor axle carrying the diametrically opposed masses, $m$, $m_1$. At each end, the axle 10 is carried in bearings 11, 12 of the gas or air flow type and which, for the sake of simplicity, are shown as cylindrical in form. The use of gas or air flow bearings, which may be of any suitable known form, permits limited displacement of the axle ends under the influence of the couples already referred to. Such displacement is in directions perpendicular to the rotor axis. Each bearing 11, 12 is split in a plane parallel to the plane ZOX, FIG. 1, and the two halves 11a, 11b and 12a, 12b of each bearing are then separated by a layer of insulating material 13. Each half-bearing is electrically insulated from its support (not shown).

FIG. 3 is a longitudinal cross-section taken through the rotor axle and its bearings in the plane XOY, FIG. 1, and from which it will be apparent that there will be an electrical capacitance $a$ between the axle and the half-bearing 11a, and similar capacitances $b$, $c$ and $d$ between such axle and the other half-bearings 11b, 12a and 12b respectively. The couples (1), (5) and (6) referred to above cause the axle 10 to oscillate about the point W in such a manner that the capacitances $a$ and $d$ will simultaneously increase while those of $b$ and $c$ decrease and then, conversely, capacitances $a$ and $d$ will decrease while those of $b$ and $c$ increase.

FIG. 4 illustrates such capacitive system in symbolic form as fixed capacitor electrodes 11a and 11b disposed on opposite sides of an intermediate and common movable electrode constituted by one end of the rotor axle 10 and as similar fixed capacitor electrodes 12a and 12b disposed on opposite sides of a further intermediate and common movable electrode constituted by the opposite end of the rotor axle 10, the two common and intermediate electrodes being interconnected through the body of the axle.

In the arrangement of FIG. 4, a first source 14 of alternating current, e.g. at a high or radio frequency, is connected to the electrode 11b and through a suitable load impedance 15 to the electrode 12a. A second source 16 of alternating current (of a frequency of similar order to but different from that of the source 14) may be connected to the electrode 11a and through a further load impedance 17 to the remaining electrode 12b. The opposite ends of the load impedance 15 are connected respectively to the input terminals of a demodulator 18 which includes filter means arranged to pass the frequency $2\Omega$ and to block the passage of the frequency $\Omega$. The signal output, at frequency $2\Omega$, from the demodulator/filter means 18 is then fed to an amplifier 19 and the output from the latter applied, in parallel, to each of two similar phase-sensitive rectifier circuits 20 and 21. The phase-sensitive rectifier circuit 20 is also supplied with a first reference alternating current of frequency $2\Omega$ from a source 22 while the other phase-sensitive rectifier circuit 21 is similarly supplied with a second reference alternating current, also of said frequency $2\Omega$, from a source 23. As will be explained later, the respective phases of the reference currents from these sources 22 and 23 have a particular constant phase angle relationship to each other and to the angular position of the rotor at any instant and are accordingly rigidly synchronised with the rotor axle by means indicated schematically by the chain-dotted lines 26.

The resultant signal output from the phase-sensitive rectifier circuit 20 is applied as a control signal input to a servo drive system 24 of any convenient known form which is arranged to cause rotation of the gimbal member 27 about the axis $ZOZ_1$. The resultant output signal from the other phase-sensitive rectifier circuit 21 is similarly applied as a control signal input to a second servo drive system 25, also of any convenient known form, which is arranged to cause rotation of the gimbal member 28 relatively to the gimbal member 27 about the axis $YOY_1$. The gyroscope rotor, indicated schematically at the upper part of FIG. 4, is, of course, mounted in the usual manner within the gimbal member 28, as shown in dotted lines, for rotation about the axis $XOX_1$.

In the operation of this arrangement, current from the, e.g. radio frequency, source 14 is caused to pass through capacitance $b$ to one end of the rotor axle 10 and then from the opposite end of such axle through capacitance $c$ and the load impedance 15 back to the opposite terminal of the source 14. In the event of any oscillation of the rotor axle under the influence of the couples (1), (5) and (6) referred to above, the impedance of the circuit through the capacitances $b$ and $c$ will fluctuate and a corresponding amplitude modulated signal or signals, at the carrier frequency of the source 14, will appear across the load impedance 15. This signal or these signals, as the case may be, are then demodulated in the demodulator 18 to provide an output alternating current signal, which may be of simple or of complex form, representative of one or more of the said couples (1), (5) and (6).

It will be noted that, with the bearings divided as described above in the plane XOZ, FIG. 1, the capacitive sensing arrangements are responsive only to the couples (1), (5) and (6). If, on the other hand, the bearings are divided in the plane XOY, the resultant capacitive sensing arrangements are responsive only to the couples (2), (3) and (4). If desired, the gas bearings could be divided into four quadrants in two perpendicular planes each intersecting along the axis XOX₁ and each at 45° to the plane of ZOX. By the use of different input current frequencies and appropriate subsequent separation by tuned circuits, it would then be possible to deal separately with the couples (1), (5) and (6) and the couples (2), (3) and (4). This is regarded as unnecessary however as the required information can readily be derived from the simpler arrangement as illustrated, in the following manner.

By the inclusion within the means 18 of suitable filter means arranged to block the passage of any alternating current signals in the demodulated signal output derived from the load 15 which are at the rotor frequency $\Omega$, the effects of couple (6) referred to above together, also, with those of unbalanced forces due to mechanical imperfections can be eliminated. Such filter means are arranged to pass signals at the frequency $2\Omega$, i.e. those which are representative of the remaining couples (1) and (5). Of these, couple (1) is due to precession about the axis ZOZ₁ and couple (5) is due to precession about the axis YOY₁. It will be seen that couples (1) and (4) reach their maximum positive and negative values when the angle POZ, FIG. 1, is either 45° or 135° whereas couples (2) and (5) are at their maximum positive and negative values when the angle POZ is either 0° or 90°. The couples (1) and (5) are, therefore, in quadrature and the respective output signals which are derived therefrom will likewise be in quadrature. This permits their convenient separation by means involving their respective comparison with a reference alternating current having the same frequency $2\Omega$ and which is rigidly synchronised and phase-related to the rotating rotor 10 of the gyroscope. For this purpose, the complex signal output of the demodulator/filter means 18, after amplification in amplifier 19, is supplied in parallel to each of the phase-sensitive rectifier circuits 20 and 21.

The phase-sensitive rectifier circuit 20 is also supplied with a reference alternating current of frequency $2\Omega$ from source 22. This source 22 is rigidly synchronised with the rotor axle 10 and its output is arranged to be in phase with the couple (1). The resultant output from the circuit 20 is a unidirectional electric current whose amplitude is proportional to the rate of precession of the gyroscope rotor about the axis YOY₁ and whose polarity is determined by the direction of precession movement. The other phase-sensitive rectifier circuit 21 is similarly supplied with a reference alternating current also of frequency $2\Omega$ from the source 23. Like the source 22, this is also rigidly synchronised with the rotor axle 10 but its output is arranged to be in phase with the couple (5). The resultant output from circuit 21 is a unidirectional electric current whose amplitude is proportional to the rate of precession of the gyroscope rotor about the axis ZOZ₁ and whose polarity is determined by the direction of precession movement.

The respective outputs from the phase-sensitive rectifier circuits 20 and 21 will be completely independent of any force upon the gyroscope rotor due to mechanical unbalance except insofar as such unbalance itself produces precession. They can therefore each be used to control the operation of the associated servo systems 24 and 25, which operate so to rotate the gimbal members 27, 28 that the rate of precession about each axis YOY₁, ZOZ₁ is reduced to zero.

In similar manner current from the second source 16 (of a frequency different from that of the source 14) may be caused to pass through capacitance $a$ to the rotor axle 10 and then through capacitance $d$ and load impedance 17 to provide a second output across the latter, amplitude modulated at the same frequency or frequencies of the couples (1), (5) and (6). These modulation frequencies will obviously be in anti-phase relationship to those of the output across load impedance 15 and, after demodulation and filtering in circuit means corresponding to the means 18, may be used as a second input to a subsequent amplifying and phase detecting arrangement which is arranged to operate, together with the output from the means 18, according to a balanced or push-pull mode.

Although the bearing form for each end of the rotor axle shown in FIGS. 2 and 3 is cylindrical, spherical or conical bearings may be used and will avoid the need to provide separate thrust bearings of the same gas or air flow type. As an alternative to the use of a solid rotating central axle with stationary surrounding bearing halves as shown in FIG. 2 and FIG. 3, the gyroscope rotor may be carried upon a rotating sleeve revolving around a stationary axle as indicated in FIG. 5, where 10a denotes the rotor sleeve surrounding a stationary axle pin 10b anchored at each end in the associated gimbal member (not shown). Such axle pin 10b is provided near each end with pairs of semi-cylindrical capacitor electrode plates 11x, 11y and 12x, 12y which are secured thereto but electrically insulated therefrom. These plates 11x, 11y and 12x, 12y are connected in a manner exactly similar to the corresponding elements 11a, 11b, 12a, 12b shown in FIGS. 2, 3 and 4.

In constructing the "bar-type" rotor it is necessary to avoid the air friction losses involved by rotating a simple bar about its centre. This may be effected by giving the rotor the external shape of a conventional gyroscope rotor but concentrating its weight at appropriate diametrically opposed points as shown in FIG. 10, where 40 and 41 indicate weights secured at diametrically opposed positions within a circular-section annular chamber 42 defined by two thin metal shells 43, 44 disposed face-to-face and connected to the central hub region, which is secured to the rotor axle, by webs 45.

While the electrostatic pick-up or sensing means have been described as combined with the gas bearings provided in order to permit the limited displacements of the rotor axle in directions perpendicular to its axis of rotation, such pick-up or sensing means may obviously be arranged as elements which are quite separate from the bearings themselves. The arrangements so far mentioned demand a very high accuracy of roundness of the sleeve or shaft forming the rotating axle in order to avoid the introduction of an excessive alternating component of frequency $2\Omega$ in the derived signals on account of shaft ovality.

This difficulty may be avoided by the use of an intermediate stationary and floating sleeve in each gas bearing. One such arrangement is shown in FIG. 6, where the rotor axle 10 is surrounded by a floating but non-rotatable cylindrical sleeve 30 lying between the axle and the related half-bearings 11a, 11b. The respective clearances between the axle and the sleeve and between the sleeve and the half-bearings will be appropriate to the formation of a suitable gas bearing arrangement. The sleeve 30 is prevented from rotating but nevertheless left free to adjust its position in all directions perpendicular to the axis of the rotor axle by the use of one or more thin metal anchoring tongues 31 and by which electrical connection may now be made to the sleeve instead of to the rotor axle. The latter now forms no part of the associated control circuits. As in the previous alternative example of FIG. 5, a converse arrangement employing a stationary axle and a surrounding rotatable sleeve carrying the gyroscope rotor may be used, the floating sleeve being interposed between the stationary half-bearing regions of the central axle and the opposing regions of the rotating rotor sleeve.

Although the use of bearings of the gas or air flow type is preferred for mounting the rotor axle, other and more conventional types of bearing may be usuable if adapted to permit the requisite limited amount of displacement movement of the rotor axle. For example, as shown in FIG. 11, each bearing may comprise a ball race 50 which is supported within a surrounding stationary housing 51 by means of springs 52. These springs 52 may be, and preferably are, tuned to provide resonance at the required pick-up frequency 2Ω. As the pick-up means for use with such alternative bearings, electrostatic arrangements similar to those already described may be positioned adjacent each bearing as is also shown in FIG. 11. Other forms of signal pick-up means may be used both with gas bearings and with other types of bearing. For example, one or several mechanical-electric transducers of the kind resembling, for instance, a piezo-electric gramophone pick-up may be employed with the stylus or stylus supporting member coupled to the rotor axle to sense its oscillatory displacement movements.

The resistance to displacement of the rotor axle within the gas bearings and also within the spring mounted bearings mentioned above will be almost linear over the very small range of displacement movements involved and any non-linearity will tend to cause only odd harmonic components in the derived signals which are unlikely to interfere with satisfactory operation.

FIG. 12 shows in longitudinal cross-section through the rotor, one simplified practical construction of gyroscope embodying the invention. In this figure, the rotor structure 60 comprises a central hollow sleeve 61 to the centre of which is secured the sheet metal shells 43, 44 as already shown in FIG. 10 and defining a body having, outwardly, the conventional shape of a gyroscope wheel but which, inwardly, consists of a hollow annular chamber 42 containing the two diametrically opposed weights 40, 41. At each end, the sleeve 61 is fitted with short tubular liners 62 whose cylindrical inner surfaces constitute the gas or air flow bearing surfaces of the rotor. The inner end of each liner 62 is provided with a plurality of inwardly directed turbine blades 63 while the outer end of each liner is shaped to define one wall of an air or gas flow passage which is directed radially outwards from the rotor axis.

Within the rotor sleeve 61 is disposed a stationary axle pin 64 which is also tubular and is rigidly secured at each end to the associated gimbal member 28. The bore of this tubular axle pin 64 communicates at each end with an air duct 65 in the gimbal member 28 through which compressed air is supplied from a suitable external source by way of the pivotal connections between the gimbal member 28 and the other gimbal member 27 and the similar pivotal connections 66 by which such other gimbal member 27 is mounted upon the stationary framework 67 of the device.

Ports 68 in said axle pin 64 permit flow of compressed air from within the axle pin to the interior of the sleeve 61 near its centre and from which such air flows outwardly towards each end past stationary flow-directing blades 69 secured to the axle pin 64 closely adjacent the blades 63 on the sleeve 61 whereby the latter is rotated at a suitable high speed. After passing the turbine blades 63, the air flow is then used as the supporting medium for the air bearings at each end of the rotor sleeve. These incorporate intermediate stationary but radially floating sleeves 30 as already described with reference to FIG. 6. These sleeves each have outwardly turned ends 70 which, in conjunction with the shaped ends of the liners 62 and the shaped surfaces 71 at the ends of the axle pin 64, form air flow passages providing the equivalent of end thrust bearings for the rotor. The ends of the axle pin 64 facing the inner surfaces of the floating sleeves 30 carry the half-cylindrical capacitor electrode plates 11a, 11b, 12a and 12b as described with reference to FIG. 5. The connections to these plates are led out by way of slip-ring connections at the gimbal pivots in a manner similar to that employed in conventional designs for supplying operating current to an electric rotor drive motor. One set of such slip-ring connections is shown at 72 in association with the lower pivotal connection 66, which pivotal connection is also shown provided with the servo drive means comprising a worm wheel 73 secured to the gimbal member 27 and a meshing worm 74 secured to the shaft of the servo motor 75 of the servo drive means 24, FIG. 4.

The need to eliminate from the resultant control signals any component due to input fluctuation of frequency Ω makes it imperative that all possible steps should be taken in the electrical circuits to prevent the generation of even harmonics of such frequency, particularly its second harmonic 2Ω, and to this end use is made of known arrangements such as balanced or push-pull circuits and relatively high level inputs to rectifiers.

FIGURE 6 also illustrates, by way of example, one form of circuit for rectifying the modulated R.F. signals obtained from the bearing/pick-up arrangements at one end of the rotor axle. Similar arrangements may be employed in connection with the opposite end of the rotor axle. In such circuit the input R.F. signal, e.g. at 1 mc./s., from the source 14, FIG. 4, is applied to the floating sleeve 30. The opposite half bearings 11a, 11b (or the equivalent electrode plates of the embodiments of FIG. 5 or FIG. 12) are connected respectively to one end of associated resonant circuits L1, C1 and L2, C2 of identical form and each tuned to the input R.F. frequency. The opposite ends of such resonant circuits are connected to a common earth line E. The half bearing 11a is also connected to the cathode of suitable diode rectifier D1, e.g. a silicon diode, while the opposite half bearing 11b is connected to the anode of a second similar diode D2. The respective rectified diode outputs are developed across load resistors R1 and R2. After suitable filtering by means of resistors R3, R4 and capacitors C3, C4 and C5, the respective voltages are applied to the opposite ends of a potentiometer network of resistors R5 and R6, the centre point of which is connected through capacitor C6 to the control grid of a cathode follower valve stage V1 whose output is then applied to the filter section of the means 18 and thence to a further amplifier 19 such as already indicated in FIG. 4. In some circumstances the valve stage V1 may not be necessary whereupon the centre point of the resistor network R5, R6 may be connected directly to the filter means.

As already indicated, the residual unbalance of the rotating system may be due to one or both of two causes namely, (i) the axis of rotation of the rotor system does not pass through the centre of gravity of the gyroscope rotor and (ii) the principle moment of inertia of the rotating system does not coincide with the axis of rotation. Of these the unbalance produced by the first cause is likely to be much larger than that produced by the second cause and, referring to FIGURE 4, such unbalance will cause the capacity variations of capacity a to be in phase with those of the capacity c. The corresponding capacity variations produced by the second cause are similar to those of the wanted signals, i.e. the capacity variations of capacity a will be out of phase with those of the capacity c. It is desirable to ensure that wanted signals are produced with maximum amplitude and the unwanted fundamental component is eliminated so far as possible.

Figure 7:
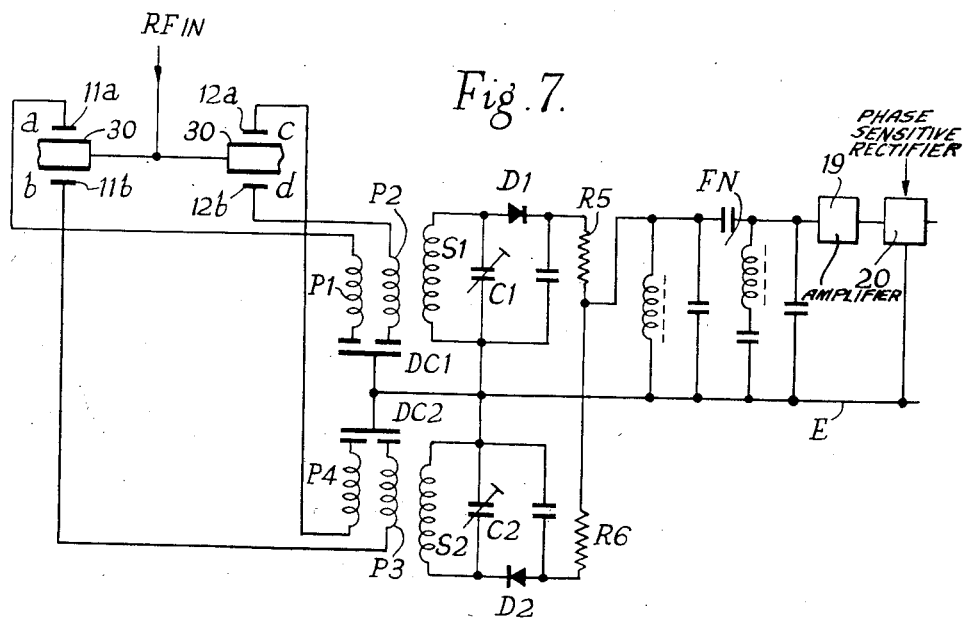
FIGURE 7 is a further circuit diagram of an alternative signal demodulator arrangement.

A further circuit arrangement particularly adapted for this purpose is shown in FIGURE 7 where the same R.F. input signal is applied to each of the floating sleeves 30 at opposite ends of the rotor axle. The half bearing 11a (or equivalent electrode plate) providing the capacitance a is connected through winding P1 to one stator plate of a differential condenser DC1. The half bearing 12b at the opposite end of the rotor axle which provides the capacitance d is connected through a further similar winding P2 to the other stator plate of the same differential condenser, the comon rotor of which is earthed. The windings P1 and P2 form two similar primary windings for a transformer whose secondary winding S1 forms part of a parallel resonant circuit with capacitor C1. The other half bearings 11b and 12a providing respectively the capacitances $b$ and $c$ are similarly connected through primary windings P3 and P4 to the stator plates of a second differential condenser DC2 whose rotor is likewise earthed. These further primary windings are associated with a second transformer of which the secondary winding S2 forms a parallel resonant circuit with capacitor C2. The two parallel resonant circuits are tuned to the frequency of the input R.F. signal. The output voltages across each of the windings are rectified by oppositely poled diodes D1 and D2 and the rectified diode outputs connected to opposite ends of a potentiometer network of resistors R5 and R6. The out-of-balance potential at the junction point between resistors R5 and R6 is then applied through a filter network FN to an amplifier 19 and thence to each of two phase-sensitive rectifier circuits as in FIG. 4, one only of which is indicated at 20.

By appropriate adjustment of the respective differential condensers DC1, DC2, the output voltage developed across the secondary windings to the associated transformers can be made substantially independent of any signal produced by simple unbalance of the gyroscope rotor.

Figure 9:
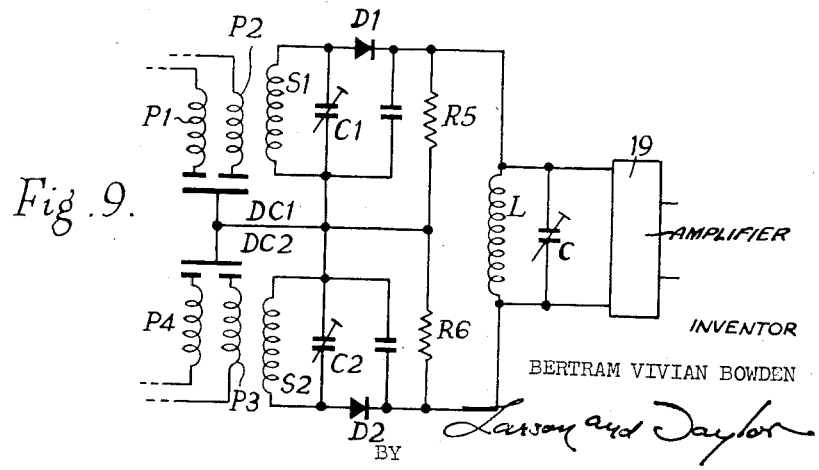
FIGURE 9 is a further fragmentary circuit diagram of another signal demodulator arrangement.

An alternative circuit arrangement, for connection to the rotor capacitances $a$, $b$, $c$ and $d$ as in FIG. 7, is shown in FIGURE 9 in which the two diodes D1, D2 are similarly poled whereby the voltage developed across the two series-connected resistors R5, R6 is the difference between the voltages available from the two diodes. This difference voltage output is applied across a parallel resonant circuit LC tuned to frequency $2\Omega$ and then fed to amplifier 19 as in the earlier circuits.

Push-pull circuits such as those described will to a large extent eliminate any signals due to ripple in the radio frequency input. It will be understood that other and more conventional types of bridge networks may be used in place of the specialised forms mentioned.

Further improvement of the discrimination in favour of the frequency $2\Omega$ may be achieved by tuning the gas or air bearings, when used, such as by providing a suitable small additional cavity between the sleeve and a small bore inlet pipe which supplies the air to the bearing.

The reference alternating current for use in the phase comparison means such as the phase sensitive rectifier circuits 20, 21, FIG. 4, may be derived in any convenient manner. One particular and preferred form of generating arrangement for such reference waveforms is illustrated schematically in FIGURE 8 where the rotating rotor axle 10 is shown provided with two spaced bands 32, 33 of alternate reflecting and non-reflecting zones, each band comprising two 90° reflecting segments 34 in diametrically opposed relationship with intervening 90° non-reflecting segments and with the segments of one band displaced circumferentially by 45° with respect to those of the other band. Light from suitable light sources 36, 37 is directed on to each band and therefrom on to photo-electric cells 38, 39. The photo-electric cells accordingly provide two alternating voltages whose frequency is twice that of the rotational speed ($\Omega$) of the rotor axle and which are respectively 90° out of phase with each other. By appropriate angular disposition of the reflecting and non-reflecting segments with respect to the diametrical line passing through the masses $m$ and $m_1$ of the bar type gyroscope rotor, such voltages can be made to be in phase respectively with the aforesaid couples (1) and (5).

As an alternative, if the gyroscope rotor is driven by a synchronous motor, the applied A.C. input to such motor can be adapted to provide two component voltages in quadrature for isolating the required signals.

The phase comparison means may each consist of a phase sensitive rectifier as already stated, such rectifier being of any suitable known form, for instance, as described by Moody in Electronic Engineering, March 1956, p. 94, or by Chaplin and Owens in Proc. I.E.E., July 1957.

Alternatively use may be made of a high speed relay operated by the reference voltage to open and close a circuit supplied with the complex signals from the rotor pick-up means. A further alternative is to employ alternate insulating and conducting strips resembling a commutator secured upon a rotating shaft which is separate from but driven in exact synchronism with the gyroscope rotor. A further alternative may comprise a device resembling a conventional watthour meter with two electromagnets adjacent a rotatable conductive disc, one magnet being supplied with the reference voltage and the other with the complex signal output from the gyroscope rotor pick-up means.

A variety of servo arrangements controlled by the signal outputs from the phase sensitive rectifier or like means are possible. In one arrangement, as shown in FIG. 4 and FIG. 12, the gyroscope gimbal members are fixed to the servo systems in such a way that the mechanical forces produced by the gyroscope are unable to move the gimbal members with respect to each other, any movement of the gimbal axes being produced only by the electrical signal output from the arrangements described. In an alternative arrangement, to each of the gimbal systems is attached a small disc of metal forming, effectively, the rotor of a Ferraris type motor, such disc being mounted close to the poles of two electromagnets carried by the opposing element of the gimbal mounting. These magnets are arranged to be energised with the output signals from the arrangements already described so as to produce movement of the gimbals tending to reduce the derived electrical signals to zero.

The rotational elements of the gyroscope system will have certain critical rotational speeds at which the gyroscope rotor may tend to oscillate. By adjusting the frequency $2\Omega$ to be at this critical resonant frequency a greatly increased amplitude of output signal may be obtained although the phase relationships may be different from those occurring when the said frequency $2\Omega$ is removed from the critical or resonant frequency. It is important that the rotational speed frequency $\Omega$ is far removed from such critical speed.

The arrangements of the present invention can be adapted to enhance the accuracy of balance of the rotor system during the balancing operation by employing the signal pick-up arrangements in combination with an amplifier tuned to the frequency $\Omega$ of rotation of the rotor, the adjustments made to the rotor being aimed at reducing the bearing "noise" signal output to minimum value.

As the phase sensitive rectifiers will be sensitive to errors in the phase of both the reference signals and the output signals from the tuned amplifier or filter circuits, it is necessary or at least desirable to drive the rotor axle at the speed corresponding precisely to the centre frequency of the filter arrangements. The fact that the system embodies two servo systems both of which will be subject to the effects of errors in phase, results in there being eventually no error in position due to any error in phase since the only position of rest in which neither servo system is working is determined by the original position of the axis of the gyroscope rotor.

When the system is to be used under conditions, such as a vehicle, where there are large sudden linear accelerations it is desirable to mount the gyroscope mechanism in the usual flexible mountings. To combat the effects of similar accelerations in angular velocity, flexible mountings may again be used while the servo system, in addition to having adequate maximum speed, is constructed to have a short time constant, for instance, of the order of one tenth of a second. A relay circuit, operated when the amplifier input approaches the overload level, may be arranged to reduce the amplifier gain and at the same time to shorten the time constant of an associated integrating circuit which follows the phase-sensitive rectifier circuit.

Numerous modifications of the arrangements as previously described may obviously be made without departing from the scope of the invention as defined in the appended claims. For example, the rotor wheel may be formed as a disc with two diametrically opposed apertures therein as a means of providing the requisite concentration of diametrically opposed masses or alternatively it may comprise two masses of very dense material, for instance, a tungsten alloy, embedded within a disc or wheel otherwise formed of light material, for instance, a light metal alloy.

Similarly, it is not essential to employ an input alternating current at high or radio frequency for modulation by the displacement sensing means associated with the rotor axle. A direct current input may be used in association with a suitably designed capacity bridge circuit of which the displacement sensing means form part.

By the suggested use of mechanical-electrical transducers, particularly devices of the piezo-electric crystal type the need for an alternating current input is again avoided. Such transducer devices may be directly associated with the rotor bearing means whereby one opposed pair of transducers, sense the displacement movements in one of the two perpendicular planes and another opposed pair of transducers sense the displacement movements in the other of such two planes.

The form of rotor drive may also be different from that shown in FIG. 12. For example, electric drive by means of an eddy current motor using driving coils mounted radially outside the rotor disc itself, may be employed. The important point to be observed in the form of drive used is that the torque produced must be applied to the rotor midway between its two bearings.

I claim:

1. A gyroscope which includes a rotor mounted within a gimbal system providing freedom for rotation about each of two mutual perpendicular axes, one of which is always perpendicular to the axis of rotation of said rotor, in which said rotor comprises an axle and two concentrated masses mounted on said axle at opposite ends of a diameter perpendicular to such axle, in which said rotor axle is journalled in one member of said gimbal system by bearing means which permit a limited amount of displacement of such axle relative to said gimbal member in directions perpendicular to said rotor axis, and which also includes means for sensing such displacement movements perpendicular to the rotor axis and for deriving therefrom at least one alternating current signal representative of such displacement movements and means for determining the frequency and phase relationship of such derived signal or signals to a reference alternating current having a frequency and phase which is directly and continuously related to the rotation of said rotor.

2. A gyroscope according to claim 1, in which said rotor axle is journalled in said gimbal member by means of bearings of the air or gas flow type.

3. A gyroscope according to claim 1, in which said rotor axle is journalled in said gimbal member by means of bearings comprising a non-rotating bearing element which is resiliently suspended by spring means.

4. A gyroscope according to claim 2, in which said air or spring suspension means are tuned to a resonant frequency which is twice that of the rotational speed of said rotor.

5. A gyroscope according to claim 1, in which the output signal or signals from said frequency and phase relationship determining means are arranged to operate precession indicating means.

6. A gyroscope according to claim 1, in which the output signal or signals from said frequency and phase relationship determining means are arranged to operate error-correcting means associated with said gimbal system.

7. In a gyroscope comprising a rotor, first and second gimbal members and a stationary support framework, said rotor being mounted for rotational movement about a first axis within said first gimbal member which is itself pivotally mounted within said second gimbal member about an axis perpendicular to said first axis and said second gimbal member is itself pivotally mounted in said stationary support framework about a third axis perpendicular to said second axis, the provision of a rotor comprising an axle and two concentrated masses mounted on said axle at opposite ends of a diameter perpendicular to the centre point of the said axle, bearing means at each end of said axle, said bearing means being of a type which permit a limited amount of displacement movement of the axle relative to the adjacent first gimbal member in directions perpendicular to such first axis, sensing means for detecting displacement movements of said axle in said directions perpendicular to said first axis, said sensing means providing alternating current signals representative of the detected displacement movements, filter means supplied with said alternating current signals from said sensing means for isolating those alternating current signals which have a frequency twice that of the rotational speed of said rotor, a source of at least one reference alternating current having a frequency which is rigidly maintained at twice that of the speed of rotation of the said rotor and a phase which is rigidly synchronised with the instantaneous angular position of said masses of said rotor, means for determining the phase relationship between said reference signal and said derived signals and for deriving therefrom separate first and second control signals, first electric servo drive means controlling the angular position of said first gimbal member within said second gimbal member and second servo drive means controlling the position of said second gimbal member relative to said stationary support framework and means for controlling the energisation of said first and second servo drive means by said first and second control signals respectively.

8. A gyroscope according to claim 7, in which said sensing means are of the capacitive type comprising at least two diametrically opposed electrode plates disposed adjacent at least one end of the rotor axle.

9. A gyroscope according to claim 8, in which said opposed capacitor plates comprise two approximately semi-cylindrical elements, the separation plane between which coincides with a plane including said rotor axis and one of the axes of rotation of said gimbal system.

10. A gyroscope according to claim 8, in which a cylindrical sleeve is interposed between said capacitive electrode plates and said rotor axle, said sleeve being held against rotation but free to float in any direction perpendicular to the rotor axis.

11. A gyroscope according to claim 7, in which said rotor comprises a tubular axle rotatable about a fixed axle pin secured at each end to one of said gimbal members.

12. A gyroscope according to claim 7, in which the concentrated masses of said rotor are located within a rotor wheel member formed as a surface of revolution about the rotor axis.

13. A gyroscope according to claim 7, in which said reference alternating currents are derived directly from said rotor.

14. A gyroscope according to claim 13, in which said reference currents are generated by photo-electric means including alternate reflecting and non-reflecting portions of one or more circumferential bands around the rotor axle.

15. A gyroscope according to claim 7, in which said frequency and phase relationship determining means comprises at least one phase sensitive rectifier circuit having one input supplied with signals derived from said sensing means and a second input supplied with reference signals of a frequency twice that of the rotational speed of said rotor and with a phase relationship which is continuously locked to the instantaneous angular position of said rotor masses.

16. A gyroscope according to claim 8, in which said capacitive sensing elements form part of a circuit including a load impedance and a source of oscillatory signals of a frequency many times that of said rotational speed of said rotor, and which includes demodulator means for deriving said representative alternating current signal from the amplitude modulation of said oscillatory source signals caused by capacitive variations in said sensing means.

17. A gyroscope according to claim 16, in which said demodulator means are arranged to operate with balanced or push-pull signals.

18. A gyroscope which includes a rotor comprising an axle and two concentrated masses mounted on said axle at opposite ends of a diameter perpendicular to the axis of said axle, a member carrying said rotor, bearing means for said rotor axle which permit a limited amount of displacement of such axle, relative to said member by which it is carried, in directions perpendicular to the rotor axis and means for sensing the amplitude and angular directions of those displacement movements of said axle which occur at a frequency which is twice that of the rotational speed of said rotor.

19. A gyroscope which includes a rotor, a gimbal member rotatably supporting said rotor, said gimbal member being itself rotatably mounted for movement about a first axis perpendicular to the axis of rotation of said rotor in which said rotor comprises and axle and two concentrated masses mounted on said axle at opposite ends of a diameter perpendicular to said rotor axle, in which said rotor axle is journalled in said first gimbal member by bearing means which permit a limited amount of displacement of said rotor axle relative to said member in directions perpendicular to said rotor axis and which includes first displacement sensing means for sensing the amplitude of any displacement movements of said rotor axle which occur twice in each revolution of said rotor in a first plane which includes said rotor axis and lies at 45° to said first axis and second displacement sensing means for sensing the amplitude of any displacement movements of said rotor axle which occur twice in each revolution of said rotor in a second plane which also includes said rotor axis and lies at 45° to said first axis but is at right angles to said second plane.

References Cited in the file of this patent

UNITED STATES PATENTS

| | | |
|---|---|---|
| 2,472,824 | Hays | June 14, 1949 |
| 2,822,694 | McKenney | Feb. 11, 1958 |

FOREIGN PATENTS

| | | |
|---|---|---|
| 198,857 | Germany | June 4, 1908 |